(12) United States Patent
Chen et al.

(10) Patent No.: US 8,826,416 B2
(45) Date of Patent: Sep. 2, 2014

(54) ELECTRONIC DEVICE AND METHOD FOR UNLOCKING ELECTRONIC DEVICE

(75) Inventors: Shu-Ping Chen, New Taipei (TW); Hsiao-Ping Chiu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 65 days.

(21) Appl. No.: 13/526,587

(22) Filed: Jun. 19, 2012

(65) Prior Publication Data

US 2013/0219488 A1 Aug. 22, 2013

(30) Foreign Application Priority Data

Feb. 21, 2012 (TW) .............................. 101105707 A

(51) Int. Cl.
G06F 12/14 (2006.01)
G06F 21/36 (2013.01)
H04L 29/06 (2006.01)
H04L 9/32 (2006.01)

(52) U.S. Cl.
CPC .............. G06F 21/36 (2013.01); H04L 63/083 (2013.01); H04L 9/32 (2013.01)
USPC ............ 726/17; 726/19; 726/5; 726/6; 726/7; 726/8

(58) Field of Classification Search
CPC ......... G06F 21/36; G06F 21/31; G06F 21/32; G06F 21/46; G06F 3/0481; H04L 9/32; H04L 9/3226
USPC ...................... 726/17–20, 2–7; 713/183–184; 715/741, 764
See application file for complete search history.

(56) References Cited

U.S. PATENT DOCUMENTS

2010/0058437 A1* 3/2010 Liew et al. ......................... 726/2
2010/0186074 A1* 7/2010 Stavrou et al. .................... 726/7
2010/0325721 A1* 12/2010 Bandyopadhyay et al. .... 726/19

FOREIGN PATENT DOCUMENTS

TW 201039167 A1 11/2010

* cited by examiner

*Primary Examiner* — Amare F Tabor
*Assistant Examiner* — Noura Zoubair
(74) *Attorney, Agent, or Firm* — Novak Druce Connolly Bove + Quigg LLP

(57) ABSTRACT

A method for unlocking an electronic device, a first image in a first area and a second image in a second area selected on a touch panel of the electronic device are received. The method combines the first image and the second image to obtain a selected combination image, and unlocks the electronic device upon the condition that the selected combination image is stored in a storage unit of the electronic device.

16 Claims, 5 Drawing Sheets

ELECTRONIC DEVICE AND METHOD FOR UNLOCKING ELECTRONIC DEVICE

BACKGROUND

1. Technical Field

Embodiments of the present disclosure relate to electronic device unlocking technology, and particularly to an electronic device and method for unlocking the electronic device using an image matching method.

2. Description of Related Art

Electronic devices (e.g., a mobile phone) may be unlocked by inputting a preset key combination on a keyboard (including a hardware keyboard or a software keyboard) of the electronic device, or using a slide unlock mode. However, certain types of electronic devices (i.e., intelligent televisions) do not have a keyboard to input unlocking keys, and do not support the slide unlock mode to perform an unlocking operation, a user of these kinds of electronic devices must perform the unlocking operation using a special controller (e.g., a wireless remote controller). Therefore, there is room for improvement in the art.

DETAILED DESCRIPTION

All of the processes described below may be embodied in, and fully automated via, functional code modules executed by one or more general purpose electronic devices or processors. The code modules may be stored in any type of non-transitory computer-readable medium or other storage unit. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
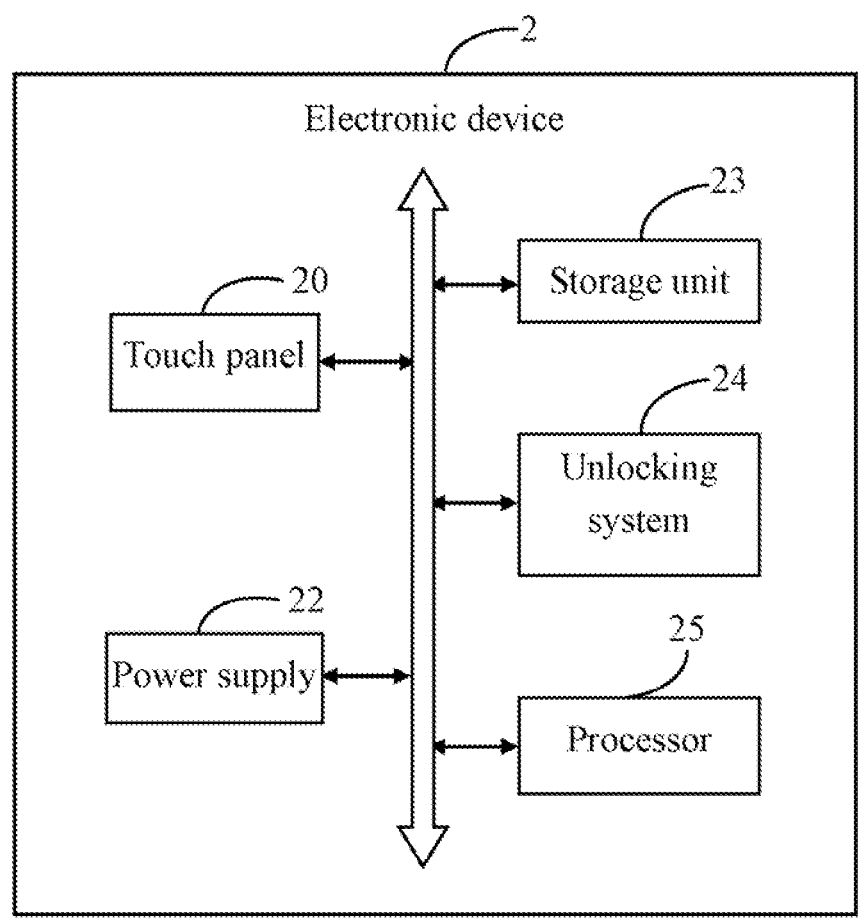
FIG. 1 is a schematic diagram of one embodiment of an electronic device including an unlocking system.

FIG. 1 is a block diagram of one embodiment of an electronic device 2 including an unlocking system 24. The electronic device 2 further includes a touch panel 20, a power supply 22, a storage unit 23, and at least one processor 25. The electronic device 2 may be a smart phone, a personal digital assistant (PDA), or other computing device. It should be understood that FIG. 1 illustrates only one example of the electronic device 2 that may include more or fewer components than illustrated, or have a different configuration of the various components in other embodiments.

In one embodiment, the touch panel 20 may be a touch sensitive screen, such as a capacitive touch sensitive screen. The power supply 22 is used to provide power for the electronic device 2.

The unlocking system 24 is used to unlock the electronic device 2 using a predetermined image matching method. In one embodiment, the unlocking system 24 may include computerized instructions in the form of one or more programs that are executed by the at least one processor 25 and stored in the storage unit 23 (or memory). A detailed description of the unlocking system 24 will be given in the following paragraphs.

Figure 2:
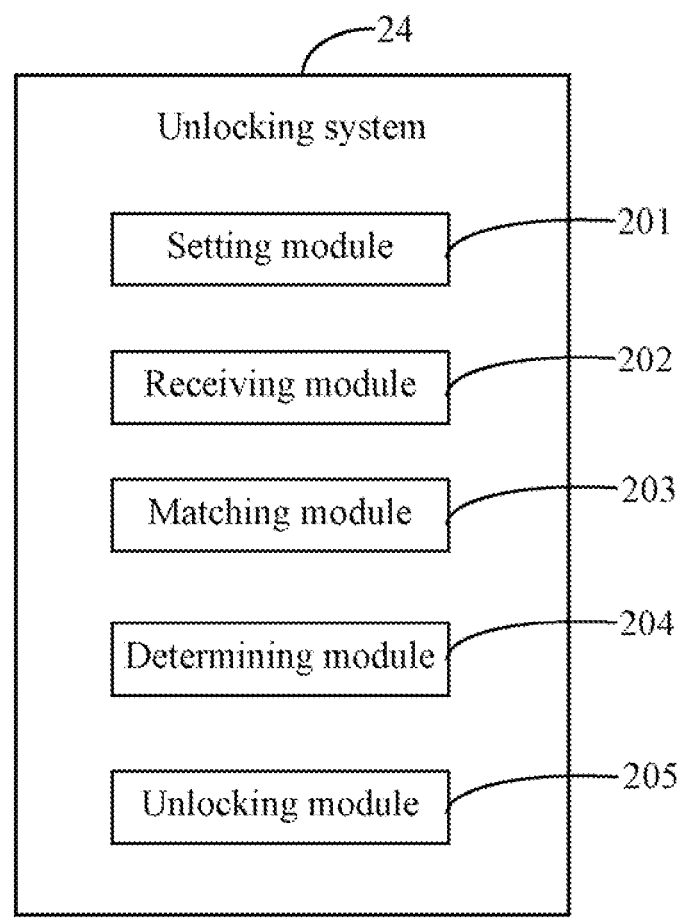
FIG. 2 is a schematic diagram of function modules of the unlocking system included in the electronic device.

FIG. 2 is a block diagram of function modules of the unlocking system 24 included in the electronic device 2. In one embodiment, the unlocking system 24 may include one or more modules, for example, a setting module 201, a receiving module 202, a matching module 203, a determining module 204, and an unlocking module 205. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3:
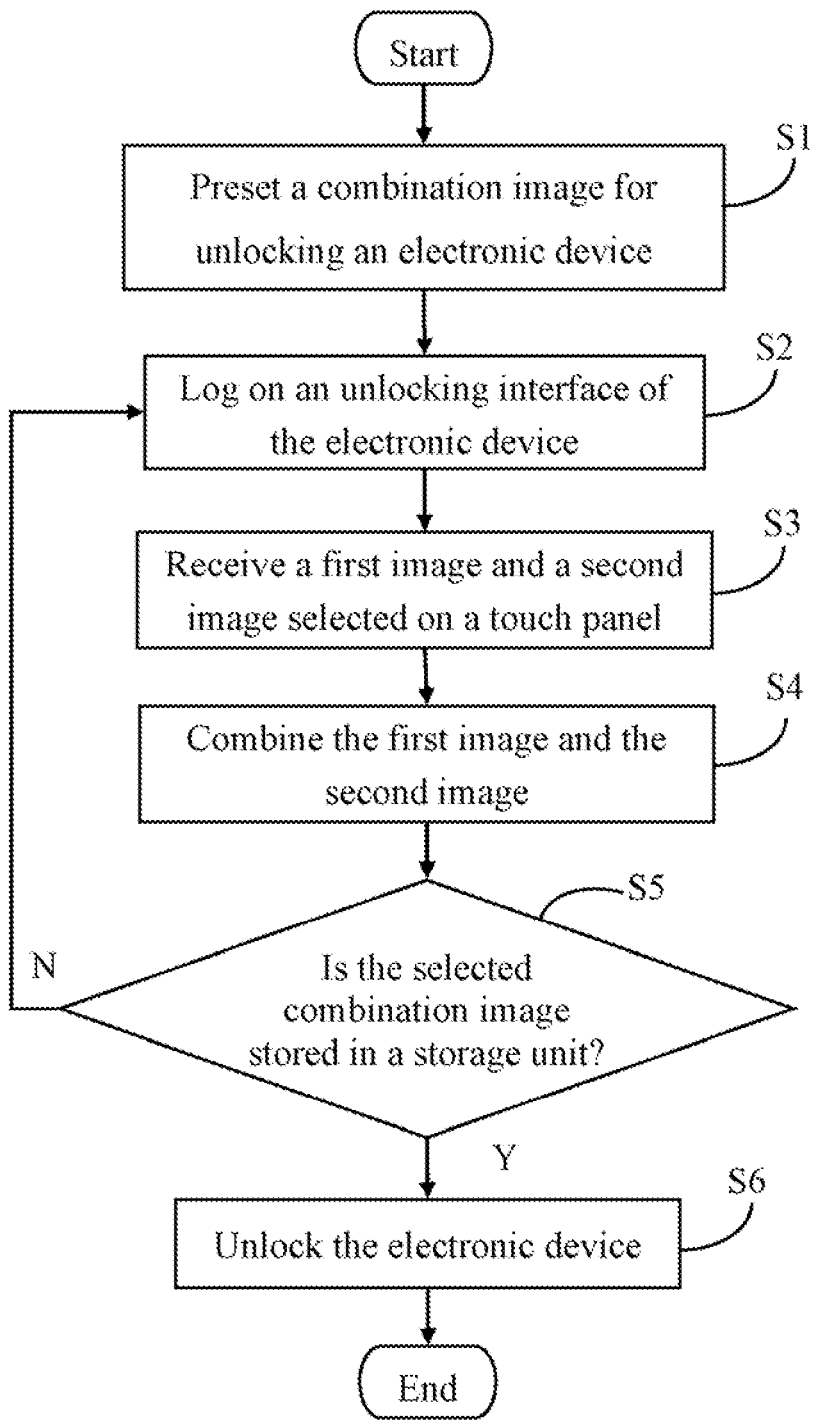
FIG. 3 is a flowchart of one embodiment of a method for unlocking the electronic device.

FIG. 3 is a flowchart of one embodiment of a method for unlocking the electronic device 2. Depending on the embodiment, additional steps may be added, others removed, and the ordering of the steps may be changed.

In step S1, a user presets a combination image for unlocking the electronic device 2 using the setting module 201. In one embodiment, the preset combination image includes a first preset image representing a user account, and a second preset image representing a password of the user account. Then, the setting module 201 stores information N1 of the preset combination image in the storage unit 23. The information N1 of the preset combination image includes an identifier (e.g., a file name) of the first preset image and an identifier of the second preset image.

Figure 4A:
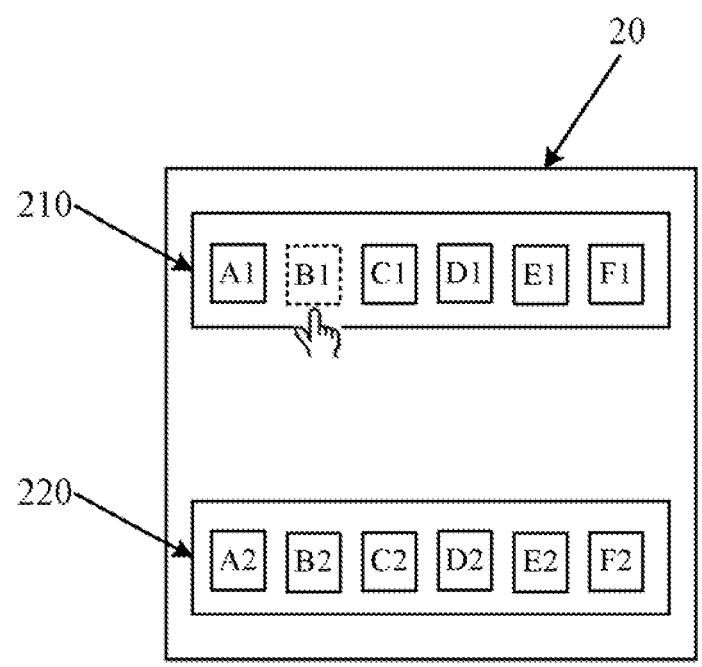
FIG. 4A and FIG. 4B are schematic diagrams of one embodiment of setting a combination image for unlocking the electronic device.

First, as shown in FIG. 4A, the user selects a first preset image (e.g., image "B1") in a first area 210 on the touch panel 20. In one embodiment, the image "B1" is displayed in a specific color (e.g., blue) when the image "B1" is selected.

Figure 4B:
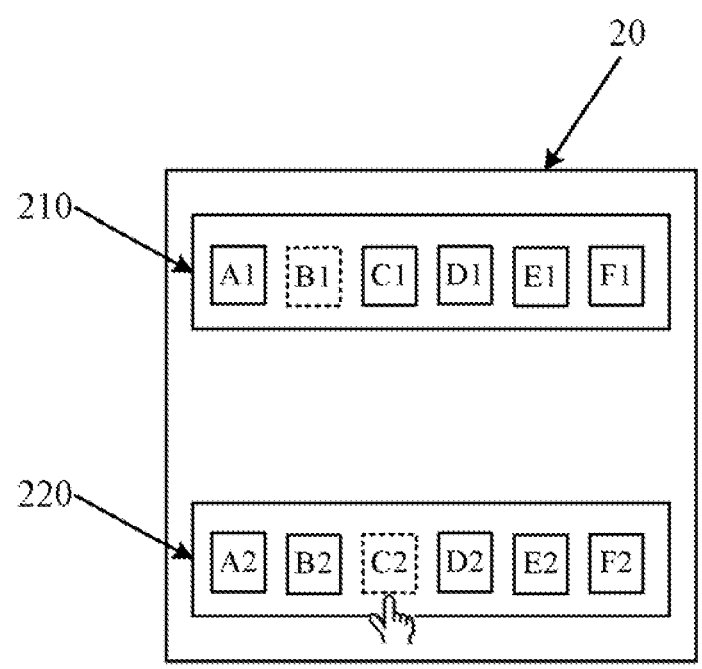

Second, as shown in FIG. 4B, the user selects a second preset image (e.g., image "C2") in a second area 220 on the touch panel 20. In one embodiment, the image "C2" is displayed in the specific color when the image "C2" is selected. For example, the image "B1" is a basketball picture, and the image "C2" may be an image of a person.

Third, the setting module 201 stores the information N1 ("B1", "C2") of the preset combination image in the storage unit 23. In other embodiments, a plurality of combination images may be preset using the setting module 201. The preset combination image may be updated or deleted using the setting module 201.

In step S2, the user logs on an unlocking interface of the electronic device 2 when the electronic device 2 needs to be unlocked. Then, the unlocking interface including the first area 210 and the second area 220 is displayed on the touch panel 20. In some embodiments, each of the first area 210 and the second area 220 provides a browse icon or button to be clicked by the user for selecting images.

In step S3, the receiving module 202 receives a first image (e.g., image "B1") selected in the first area 210 and a second image (e.g., image "D2") selected in the second area 220 of the touch panel 20 in response to receiving user selections.

In step S4, the matching module 203 combines the first image and the second image thereby generating a selected combination image, and obtains information N2 of the selected combination image. The information N2 of the selected combination image includes an identifier (e.g., a file name) of the first image and an identifier of the second image. For example, the information N2 of the selected combination image may be ("B1", "D2").

In step S5, the determining module 204 determines whether the selected combination image is stored in the storage unit 23 by comparing the information N2 with pre-stored information of the preset combination image(s) in the storage unit 23. In one embodiment, if the information N2 of the selected combination image matches the information N1 of the preset combination image (i.e., N2=N1), the determining module 204 determines that the selected combination image is stored in the storage unit 23, then the procedure goes to step S6. If the information N2 of the selected combination image does not match the information N1 of the preset combination image (i.e., N2!=N1), the determining module 204 determines that the selected combination image is not stored in the storage unit 23, then the procedure returns to step S2, the user selects new images on the touch panel 20.

In step S6, the unlocking module 205 unlocks the electronic device 2.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for unlocking an electronic device comprising a processor and a touch panel, the touch panel having a first area and a second area, the method comprising:

presetting a combination image for unlocking the electronic device, and storing information of the preset combination image in a storage unit of the electronic device, wherein the preset combination image comprises a first preset image representing a user account, and a second preset image representing a password of the user account;

receiving a first image selected in the first area and a second image selected in the second area of the touch panel in response to receiving user selections;

obtaining a selected combination image by combining the first image and the second image; and unlocking the electronic device upon the condition that the selected combination image is stored in the storage unit of the electronic device.

2. The method according to claim 1, wherein the first preset image is selected from the first area of the touch panel and the second preset image is selected from the second area of the touch panel.

3. The method according to claim 2, wherein the information of the preset combination image comprises an identifier of the first preset image and an identifier of the second preset image.

4. The method according to claim 1, wherein the selected combination image is stored in the storage unit upon the condition that information of the selected combination image matches information of the preset combination image stored in the storage unit.

5. The method according to claim 4, wherein the information of the selected combination image comprises an identifier of the first image and an identifier of the second image.

6. An electronic device, comprising:
a touch panel;
a storage unit;
at least one processor; and
one or more modules that are stored in the storage unit and are executed by the at least one processor, the one or more modules comprising:
a setting module that presets a combination image for unlocking the electronic device, and stores information of the preset combination image in the storage unit, wherein the preset combination image comprises a first preset image representing a user account, and a second preset image representing a password of the user account;
a receiving module that receives a first image selected in a first area and a second image selected in a second area of the touch panel in response to receiving user selections;
a matching module that obtains a selected combination image by combining the first image and the second image; and
an unlocking module that unlocks the electronic device upon the condition that the selected combination image is stored in the storage unit.

7. The electronic device according to claim 6, wherein the first preset image is selected from the first area of the touch panel and the second preset image is selected from the second area of the touch panel.

8. The electronic device according to claim 7, wherein the information of the preset combination image comprises an identifier of the first preset image and an identifier of the second preset image.

9. The electronic device according to claim 6, wherein the one or more modules further comprise:
a determining module that determines the selected combination image is stored in the storage unit upon the condition that information of the selected combination image matches information of the preset combination image stored in the storage unit.

10. The electronic device according to claim 9, wherein the information of the selected combination image comprises an identifier of the first image and an identifier of the second image.

11. A non-transitory storage medium having stored thereon instructions that, when executed by a processor of an electronic device, causes the electronic device to perform a method for unlocking the electronic device, the method comprising:

presetting a combination image for unlocking the electronic device, and storing information of the preset combination image in a storage unit of the electronic device, wherein the preset combination image comprises a first preset image representing a user account, and a second preset image representing a password of the user account;

receiving a first image selected in a first area and a second image selected in a second area of a touch panel of the electronic device;

obtaining a selected combination image by combining the first image and the second image; and unlocking the electronic device upon the condition that the selected combination image is stored in the storage unit of the electronic device.

12. The non-transitory storage medium according to claim 11, wherein the first preset image is selected from the first area of the touch panel and a second preset image is selected from the second area of the touch panel.

13. The non-transitory storage medium according to claim 12, wherein the information of the preset combination image comprises an identifier of the first preset image and an identifier of the second preset image.

14. The non-transitory storage medium according to claim 11, wherein the selected combination image is stored in the storage unit upon the condition that information of the selected combination image matches information of the preset combination image stored in the storage unit.

15. The non-transitory storage medium according to claim 14, wherein the information of the selected combination image comprises an identifier of the first image and an identifier of the second image.

16. The non-transitory storage medium according to claim 11, wherein the medium is selected from the group consisting of a hard disk drive, a compact disc, a digital video disc, and a tape drive.

\* \* \* \* \*